Patent …

United States Patent [19]
Schulz

[11] Patent Number: 4,957,628
[45] Date of Patent: Sep. 18, 1990

[54] APPARATUS FOR GRAVITY SEPARATION OF PARTICLES FROM LIQUID

[76] Inventor: Christopher R. Schulz, 46 Ancell St., Alexandria, Va. 22305

[21] Appl. No.: 354,440

[22] Filed: May 19, 1989

[51] Int. Cl.$^5$ ............................................. B01D 21/04
[52] U.S. Cl. ................................... 210/519; 210/521; 210/802
[58] Field of Search ............... 210/802, 519, 521, 522, 210/526, 534

[56] References Cited

U.S. PATENT DOCUMENTS

| | | | |
|---|---|---|---|
| 1,248,374 | 11/1917 | Moore | 210/802 |
| 2,573,615 | 10/1951 | Seailles | 210/521 |
| 2,973,866 | 3/1961 | Genter et al. | 210/519 |
| 3,788,981 | 1/1974 | Richard et al. | 210/522 |
| 3,886,064 | 5/1975 | Kosonen | 210/519 |
| 3,903,000 | 9/1975 | Muira et al. | 210/522 |
| 4,194,976 | 3/1980 | Robinsky | 210/521 |
| 4,514,303 | 4/1985 | Moore | 210/521 |

FOREIGN PATENT DOCUMENTS 2452950 12/1980 France .
841640 10/1978 U.S.S.R. .

Primary Examiner—Richard V. Fisher
Assistant Examiner—Christopher Upton
Attorney, Agent, or Firm—Richard C. Litman

[57] ABSTRACT

A sedimentation process for the collection and removal of solid particles from a liquid includes a basin provided with a plurality of planar baffles or settler members each having opposite ends attached to support rods, with the latter obviating the need for any beams or the like, to support the lower edges of the settler members. Manipulation of an adjustment mechanism permits simultaneous alteration of the inclination of all of the settler members without halting operation of the process. Influent is directed into the basin through a plurality of ports spaced longitudinally of one side wall thereof to more evenly distribute the influent throughout the bottom expanse of the settler members. Preferably, the settler members comprise stretchable membranes with the support rods including a shiftable, lockable mechanism permitting quick installation and variation of the tension as applied to the settler members.

12 Claims, 4 Drawing Sheets

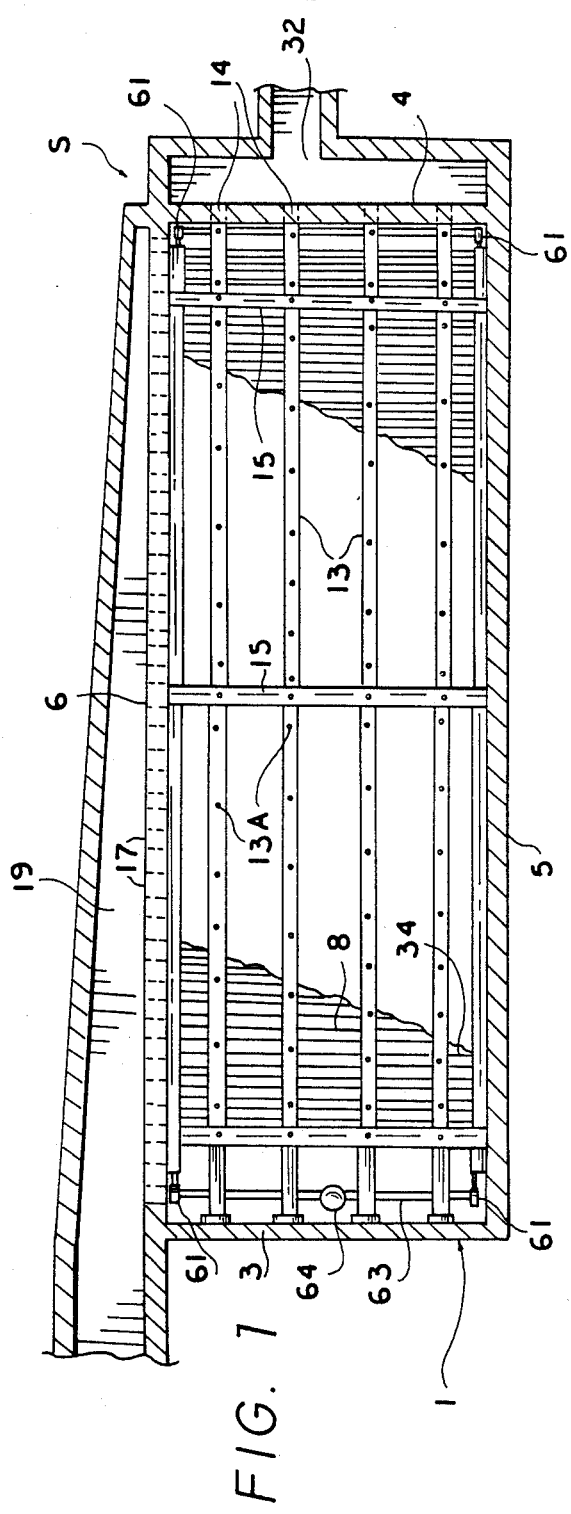
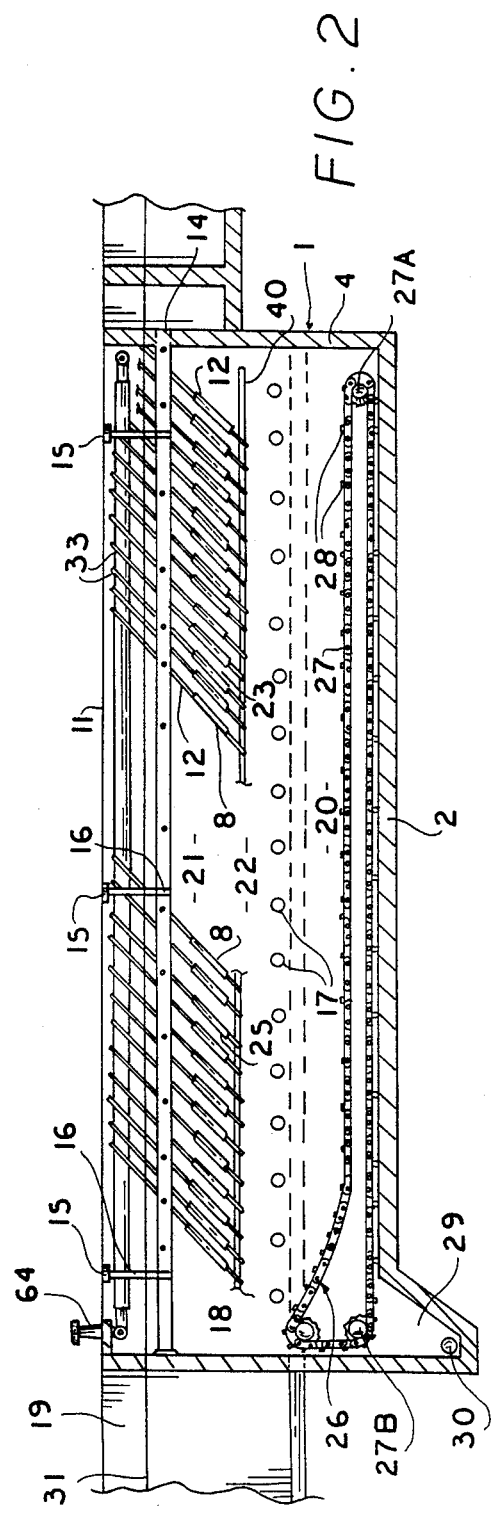

APPARATUS FOR GRAVITY SEPARATION OF PARTICLES FROM LIQUID

FIELD OF THE INVENTION

This invention relates, generally, to treatment of liquids and, more particularly, to an improved method and apparatus for the removal of particles from water or wastewater by means of an enhanced sedimentation system.

BACKGROUND OF THE INVENTION

The oldest and most widely used treatment procedure for water as supplied to municipalities or industrial sites or for wastewater as produced by these same entities, is to subject the liquid to a sedimentation process. Such systems usually comprise a confined area or basin with means for regulating the inflow of liquid thereto as well as to collect and carry away the treated effluent after a nominal detention time in the basin, during which suspended matter is given an opportunity to settle or separate by gravity from the liquid being treated.

The surface loading rate of conventional sedimentation basins can be dramatically increased by installing inclined parallel plates which effectively increase the surface area on which suspended particles may settle. These devices also promote laminar and stable flow conditions, which leads to a very high degree of separation. Conventional settling basins can be retrofitted with a plurality of inclined, parallel plates or baffles between which the influent is directed to encourage the separation of particles from the liquid. These particles impinge upon the baffle surfaces, congregate with other particles as they slide down the baffle surfaces, form larger particles and eventually fall by gravity to the basin bottom wherein they are periodically removed as a sludge product.

Several shortcomings have been apparent with many existing inclined plate settlers. The baffles or plates themselves are relatively expensive and the usual rigid construction of glass fiber reinforced plastic results in a member which accordingly must be limited in size and which tends to warp, become brittle and break off into pieces over time. Manipulation of such plates during installation, removal and repair is quite awkward. Also, settler plates are mounted in a fixed manner, thereby precluding ready variation of the angle of inclination to maximize sedimentation rates under altering conditions. The cleaning or replacement of any of the plates is a tedious procedure resulting in a significant amount of down-time.

DESCRIPTION OF THE RELATED ART

Examples of settlers employing a plurality of inclined plates or the like will be found in U.S. Pat. Nos. 3,482,694 issued to Rice et al, 3,706,384 issued to Weijman-Hane, 3,768,648 issued to Anderson et al and 4,783,255 issued to Bogusch. The alternate plate construction and adjustable mounting as proposed by the present invention is not seen to be suggested in any of the prior art of which applicant is aware.

SUMMARY OF THE INVENTION

By the present invention, an improved method and apparatus for obtaining the gravity separation of particles from a liquid is presented and which includes a plurality of uniquely attached or mounted inclined partitions or baffles whereupon an operator of the system may quickly and easily simultaneously vary the angle of inclination of all of the baffles to achieve the most efficient output of treated effluent in accordance with the characteristics of the influent. Additionally, an alternate baffle construction using stretchable membranes is proposed, which can be used in plate settlers with either fixed or adjustable mountings.

The instant mounting and fabrication of the substantially planar settler members permits the separation of individual members from adjacent members to allow for inspection and replacement in addition to permitting the ready adjustment of the angle of inclination thereof to optimize the sedimentation process. Such adjustment includes the ability periodically to dispose the settler members in a true upright or vertical manner, thereby encouraging accumulated materials to slough off the surfaces of the members.

By utilizing baffles or settler members comprising stretchable membrane material, the cost, bulk and ease of assembly are noticeably enhanced. With thinner, lightweight members, the compactness and efficiency of a high-rate sedimentation basin is significantly increased since a larger number of such baffles may be installed within any one basin, with the same usual nominal spacing therebetween of say, 2 inches, thereby increasing the total number of effective treatment zones as provided by each pair of adjacent settler members. Likewise, the overall transverse extent or length of the members may be increased over the known existing settler baffles without the need for intermediate structural support elements spanning the basin beneath the baffles, and which can interfere with the operation of associated mechanical sludge removal equipment. Moreover, a variety of membrane materials with low coefficients of friction are available and can be used to improve the removal of settled materials as they slide down the membrane surfaces, counter to the flow of liquid being treated.

The present system readily lends itself to the provision of a high-rate settler apparatus, whether newly constructed or as a retrofit to existing conventional basins.

Accordingly, one of the objects of the present invention is to provide an improved high-rate settler system including a plurality of baffles of unique construction.

Another object of the present invention is to provide an improved high-rate settler system including a basin containing transverse baffles comprising stretchable membranes.

A further object of the present invention is to provide an improved high-rate settler system including a mounting mechanism for the ends of transverse baffles permitting quick, simultaneous alteration of the inclination thereof.

Still another object of the present invention is to provide an improved high-rate sedimentation system including settler members spanning a basin with a manifold delivering influent through a plurality of ports spaced along the axial extent of the basin.

Another object of the present invention is to provide an improved high-rate settler system including a plurality of baffle members each having opposite ends attached to a support rod in turn having roller devices slidably contained within longitudinal trackways.

Yet another object of the present invention is to provide an improved high-rate sedimentation system including flexible baffle members having opposite ends attached to support rods allowing variation of the tension as applied to individual baffle members.

With these and other objects in view which will more readily appear as the nature of the invention is better understood, the invention consists in the novel combination and assembly of parts hereinafter more fully described, illustrated and claimed with reference being made to the attached drawings.

BRIEF DESCRIPTION OF THE DRAWINGS

FIG. 1 is a top plan view of a sedimentation system according to the present invention;

FIG. 2 is a vertical sectional view of the apparatus of FIG. 1;

Similar reference characters designate corresponding parts throughout the several figures of the drawings.

DESCRIPTION OF THE PREFERRED EMBODIMENT

Figure 3:
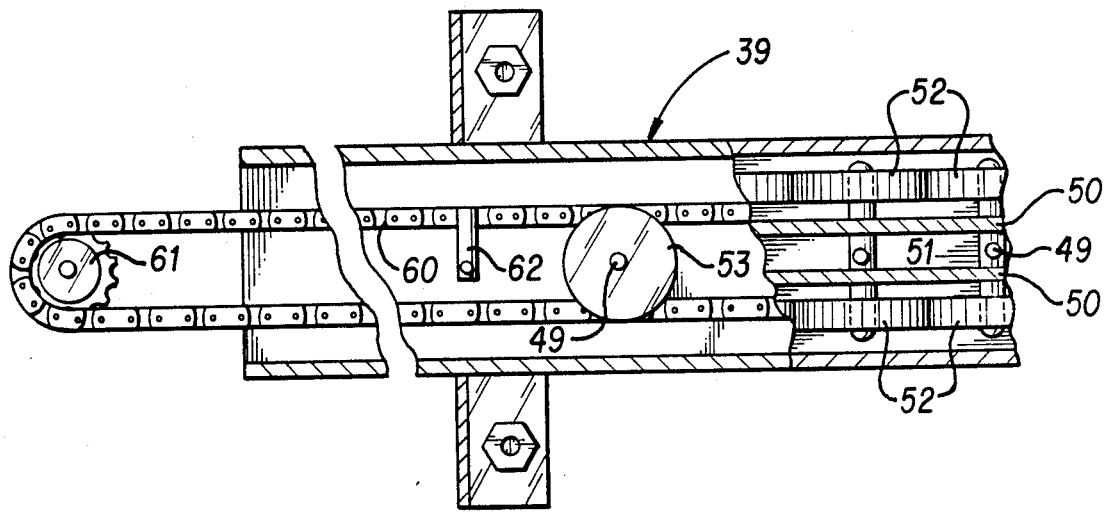
FIG. 3 is an enlarged vertical sectional view through one of the barrier assembly support and adjustment channels.

Referring now to the drawings, particularly FIGS. 1 and 2, the present invention will be seen to relate to a sedimentation system, generally designated S and which includes a structural tank or basin 1. As a minimum, the basin 1 is provided with a bottom 2 and one or more peripheral walls, such as the illustrated opposed end walls 3,4 and side walls 5,6. It is well known to provide sedimentation basins having rectangular, square or circular configurations to accommodate the attendant operating structure and demands imposed by the nature of the intended influent.

Inasmuch as the present apparatus utilizes a plurality of baffles or settler members comprising parallel, substantially planar members, between which the influent is directed in order to capture solid particles contained in the influent, the preferred configuration comprises an elongated, rectangular basin as shown in the drawings. Generally speaking, but with certain constraints, it is desirable to employ the greatest number of settler members possible in order to maximize the degree of achieved sedimentation with the ultimate fluid flow rate through the apparatus. With the present type of settler members, the adjustable mounting means and the manner of admitting the influent into the basin, it will be appreciated that an elongated, rectangular configuration is preferable wherein the parallel side walls 5,6 are substantially longer than the parallel end walls 3,4.

The sedimentation action is accomplished by means of a plurality of transversely disposed baffles or settler members 8 substantially spanning the width of the basin interior 9, throughout the majority of its length. In the conventional settling apparatus, these baffles comprise rigid plates made of fiberglass, asbestos-cement or wood and have their opposite ends fixedly attached to the basin side walls. The mass of such members usually limits the length thereof and also necessitates the inclusion of underlying support beams and columns which obviously impede the free falling of sediment particles and can interfere with the operation of mechanical sludge removal equipment.

The baffles 8 of the present invention comprise relatively lightweight members preferably made of flexible stretchable membranes. When the system S is operational, the basin interior contains liquid defining a top surface 10 which will be seen from FIG. 2 to be disposed well below the top 11 of the basin 1. The baffles 8 are retained within the liquid with their top edges 12 in a plane spaced beneath this liquid surface 10 with effluent collection and removal means disposed intermediate the baffle top edges 12 and liquid surface 10. This collection and removal means comprises submerged effluent launders or overflow weirs. The preferred means includes a plurality of laterally spaced apart perforated pipes 13 extending longitudinally of the basin interior 9 from the leading end wall 3 to downstream end portions, communicating with individual effluent ports 14 through the trailing end wall 4. To support the pipes 13 and maintain their full length in a horizontal disposition, a plurality of transverse beams or supports 15 span the tops 11 of the two side walls 5,6. Hangers 16 suspended from these beams 15 are then suitably connected to the pipes 13.

Liquid to be treated by the present apparatus is preferably admitted into the basin interior 9 through a plurality of influent ports 17 formed in one side wall 6, at a level below that of the bottom edges 18 of the settler members 8. Supplying these ports 17 is an influent manifold or channel 19 extending longitudinally adjacent the basin side wall 6, and preferably with a tapered cross-section to promote uniform flow distribution through influent ports 17.

As an alternative to the longitudinal disposition of the effluent pipes 13, such discharge means may comprise a plurality of transversely arranged perforated pipes (not shown), spanning the two side walls 5,6 and which would have outlet ports through a side wall opposite that containing the influent ports 17. In this manner, in view of the shorter length of such pipes, support beams and hangers will not be required.

The sedimentation process itself is well known. Influent is admitted to the basin to the lower liquid area 20 beneath the baffles 8 while a corresponding volume of effluent is displaced and drawn off from the upper liquid area 21 adjacent the liquid top surface 10. As the influent migrates from the lower area to the upper area, it passes through the intermediate area 22 containing the settler members 8. To enhance the settling of particles on the stationary baffles 8, the latter are mounted at an inclination with their top edges 12 directed toward the discharge or trailing end wall 4. Thus, it will be understood that as long as new influent is being delivered into the basin, at least a minimal amount of the liquid will be directed, in an upward manner, through the laminar passageways 23 formed between each two adjacent baffles 8. As suspended solids progress through the laminar passageways, they are subjected to two force vectors. One is the gravity force pulling the particles downwardly and the other is the flow velocity vector forcing the particles upwardly and along the length of the baffle. By inclining the baffles in close proximity to each other, the settling distance is greatly reduced so a larger number of solid particles can impinge upon the inclined upwardly facing surfaces 25 of the opposed baffles. The majority of these particles will continue to descend, sliding down the respective baffle surfaces 25, aggregating with adjacent particles to form larger and heavier particles, and thence settling adjacent the basin bottom 2.

Clean-out means is included within the basin to permit continuous removal of accumulated sludge in the lower area 20 and may take the form of the sludge collector assembly 26 shown in FIG. 2. An automated removal process is provided by endless chains 27 driven by sprockets 27A adjacent each basin side wall connected to common shafts 27B and having transverse flights 28 thereupon. As the chains are operated by suitable motor means (not shown) in a clockwise direction as viewed in FIG. 2, sludge collected upon the basin bottom 2 is driven towards the leading end wall 3. A sump or hopper 29 receives the delivered sludge for subsequent removal from the system by means of a drain 30.

After the liquid has been drawn through the passageways 23 between the various settler members 8 and passes the top edges 12 thereof, it is relatively free of solid particles and is collected within the perforated pipes 13 forming the effluent launders. Since these pipes are level and disposed at an elevation slightly below that of the influent level 31 within the influent channel 19 it will follow that the force of gravity will insure that treated liquid is collected uniformly through the pipe perforations 13A, providing a constant discharge of the effluent from the ports 14 in the trailing end wall 4. These ports will be seen to communicate with an outlet channel 32 adjacent the exterior of the basin end wall 4.

With the above described operation it will be appreciated that an improved sedimentation process is achieved in view of the distribution of the influent as transversely directed into the basin lower area 20 through the plurality of spaced influent ports 17 extending throughout the basin interior beneath the bottom edges 18 of the assembly of settler members 8. In this manner, equally divided flows of the particle-containing influent are treated by separate adjacent groups of the baffles 8 for a most efficient treatment. This is in contrast to existing sedimentation basins wherein the entire influent flow is usually admitted to the basin interior, in a longitudinal direction, through the leading end wall 3, which generally induces a very poor pattern of flow distribution between the settler members.

Notwithstanding the above, the improved baffle construction presented by this invention, together with adjustable mounting means, therefore will be understood to vastly enhance the sedimentation process whether applied to existing conventional basins as a retrofit installation or incorporated in a basin as proposed herein.

The settler members 8 are retained in the use position by means of a separate support rod 33 to which each end or side edge 34 of every baffle 8 is attached. As previously described, the baffles may comprise substantially rigid planar members constructed of any suitable composition such as glass fiber reinforced plastic, although the preferred material will be a flexible, stretchable composition. Any well known resilient material such as synthetic rubber or nylon fabric may be utilized and which lends itself to at least a nominal stretching, in a membrane fashion. Such flexible baffles are shown in the drawing figures about to be described.

Figure 8:
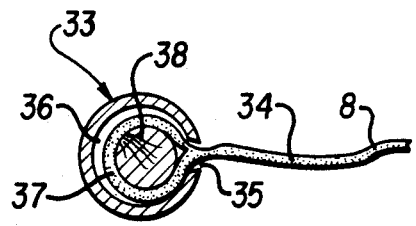
FIGS. 8 and 9 are horizontal sectional views illustrating alternate positions of the settler member support rods during installation or adjustment of the tension of flexible settler members.

FIGS. 3–9 depict the attachment of the baffle ends 34 to the respective support rods 33 and the mounting of these rods to the basin side walls 5,6 in a manner to permit the ready adjustment of the inclination angle of the supported baffles 8. Each support rod 33 comprises an elongated pipe provided with a longitudinal slot 35 communicating with the pipe central bore 36. The baffle ends 34 are formed with a closed loop 37 adapted to receive a dowel 38 with these latter two components defining a diameter less than that of the pipe bore 36, initially to permit the free insertion of the dowel-equipped baffle ends into the support rods 33 as shown in FIG. 8. The dowel 38 extends into the upper reaches of support rod 33 so that it may be removed through the top end of the support rod during replacement of a baffle 8, as will be further discussed hereinafter.

The support rods 33 at both ends of all of the baffles 8 are adapted in turn to be mounted with their opposite ends respectively supported by a top channel 39 and bottom support member 40 affixed to the inner surface 41 of each basin side wall 5,6. To attach each support rod 33 to the top channel 39, a roller assembly 42 having a horizontal mount rod 43 is provided for each end of each baffle 8. As will be seen most clearly in FIG. 7, the roller assemblies 42 are captively retained within the confines of the top channel 39, between its top wall 44, bottom wall 45 and the two vertical inner walls 46,46. The roller assemblies 42 bear against anti-friction surfaces 42A,42A mounted on the inner walls 46,46, and will be understood to provide for minimal frictional attachment of the top end 47 of the support rods 33 to the basin top channel 39. Each roller assembly mount rod 43 includes an outer collar or nut 48 adapted to surround and engage the threaded top end 47 of a support rod 33 and is joined to an axle 49 slidably disposed within the throat as defined between two flanges 50,50 directed inwardly from the top channel inner walls 46,46. This axle 49 is journalled within a vertical roller axle 51 having a pair of horizontal rollers 52,52 in turn journalled at its ends. The inner end of certain ones of the axles 49 will be understood to be equipped with a vertical sheave or pulley 53, the purpose of which will be discussed hereinafter.

The lower end 54 of each support rod 33 includes a bushing 33A which is threadedly attached to the support rod and can be removed to allow the insertion of a baffle 8 and dowel assembly 38 through the bottom of the support rod. A depending guide rod 55 is in turn, threadedly attached to the bushing 33A and its lower end is inserted through a selected one of a plurality of spaced apart openings 56 formed in the bottom support member 40. These openings 56 are configured to permit an unimpeded axial sliding movement of the guide rod 55 as well as allow an angular displacement thereof as the inclination of the support rods 33 is altered.

Figure 9:
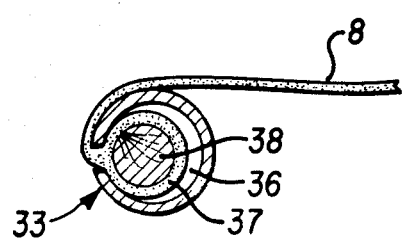
Figure 6:
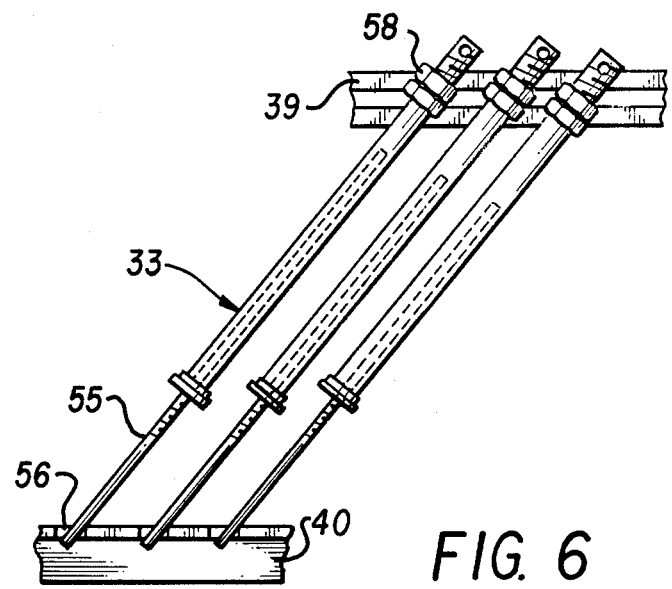

With a baffle 8 and dowel 38 inserted through the bottom of a support rod 33 and retained within bore 36 by a bushing 33A, the guide rod 55 is passed through one of the bottom support member openings 56 and thence, the top threaded end 47 of the support member is screwed into and through the collar 48 of a roller assembly 42. With both ends 34,34 of any one baffle 8 thusly attached, the membrane is stretched to provide a substantially planar or taut condition by rotating the respective support rods 33 such as shown in FIG. 9. To facilitate this operation, appropriate tool-engaging means such as bores 57, may be provided in the top end 47 of each support rod. When the desired degree of tautness is achieved, a jam or lock nut 58 is secured against the top of mount rod collar 48 to retain the stretched condition. Installation or replacement of the baffle ends may otherwise be achieved with the support rods 33 already attached to the roller assemblies by initially inserting a baffle end loop 37 through the support rod slot 35 and thence lowering the dowel into the loop. Thereafter, the support rod is rotated to obtain the desired tautness following which the lock nut 58 is tightened against the mount rod collar 48.

Figure 4:
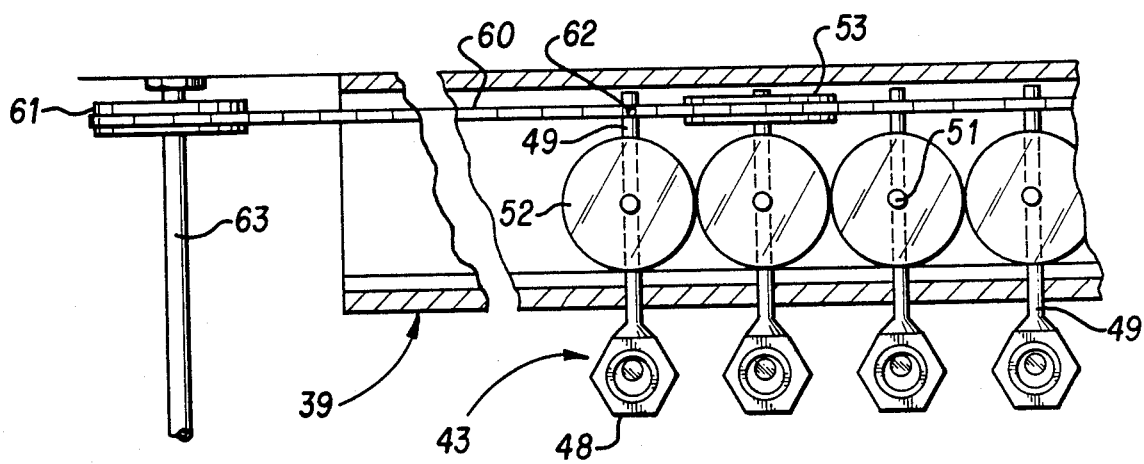
FIG. 4 is a horizontal sectional view through the support and adjustment mechanism shown in FIG. 3.
Figure 7:
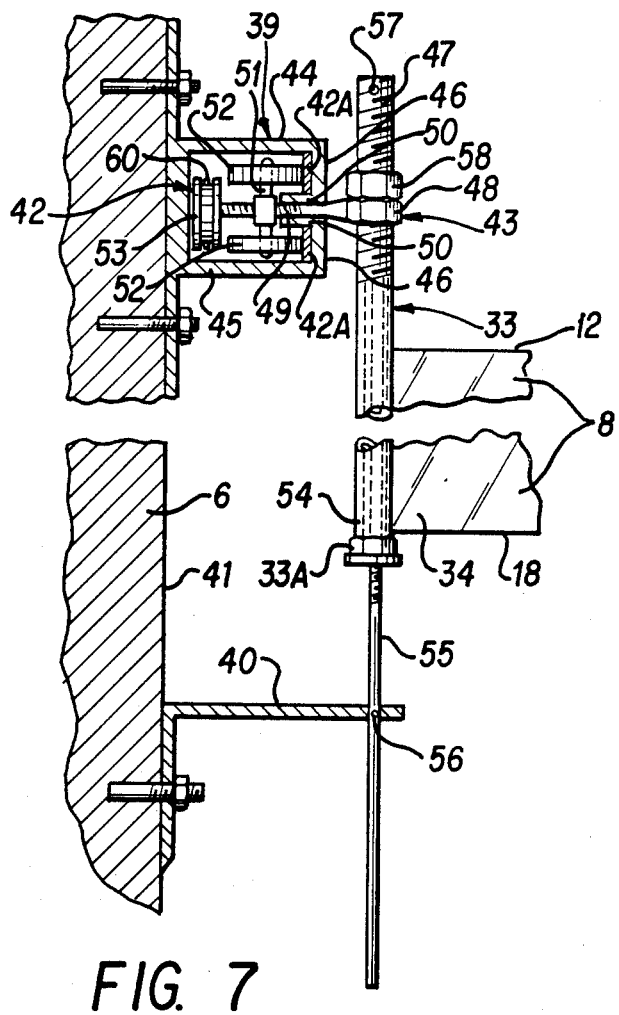
FIG. 7 is an end elevation, partly in section, of one of the settler member support rods.

The longitudinal sectional views of FIGS. 3 and 4 most clearly depict the relationship between adjacent ones of the roller assemblies 42 and wherein it will be seen that the periphery of the horizontal rollers 52,52 are in abutment. Accordingly, the diameter of these rollers will define and consistently maintain the resultant spacing between the plurality of settler members 8. It will be noted that the lateral extent, or width, of the mount rod collars 48 must necessarily be less than the diameter of the rollers 52 to insure that these rollers remain in abutment with one another and thus constantly maintain the supported baffles 8 in the proper, equi-spaced disposition. As mentioned above, selected ones of the horizontal axles 49 are provided with an endmost pulley or sheave 53. These sheaves provide support for an endless chain or cable 60, the ends of which are sheaved about a drive sprocket 61, located adjacent each basin end wall, as shown in FIGS. 1-4. At least two removable connecting links 62 are carried by the top run of the chain 60 and are joined to the end of the first and last roller assembly axles 49 as shown in FIGS. 3 and 4. These links 62 serve to transmit horizontal displacement of the chain 60 and a corresponding horizontal movement of all of the roller assemblies 42 associated therewith.

The two drive sprockets 61 are simultaneously driven by means of a common transverse shaft 63 located adjacent one end wall, such as the leading end wall 3, and having a suitable operating mechanism 64 as shown in FIGS. 1 and 2. Thus, by manipulating the operating mechanism 64, the two sprockets 61,61 are actuated, along with the respective drive chains 60,60 to longitudinally displace all of the roller assemblies 42. This displacement produces an alteration of the inclination of the plurality of support rods 33 and attached settler members 8 such as between the two extremes shown in FIGS. 5 and 6.

Figure 10:
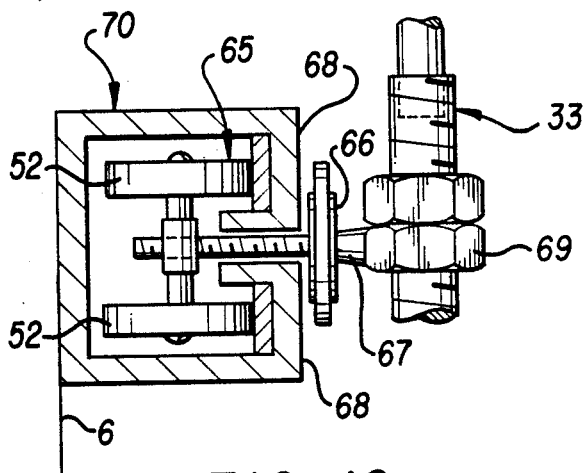
FIGS. 10 and 11 are vertical sectional views showing alternate embodiments of the support and adjustment mechanism as shown in FIG. 7.
Figure 11:
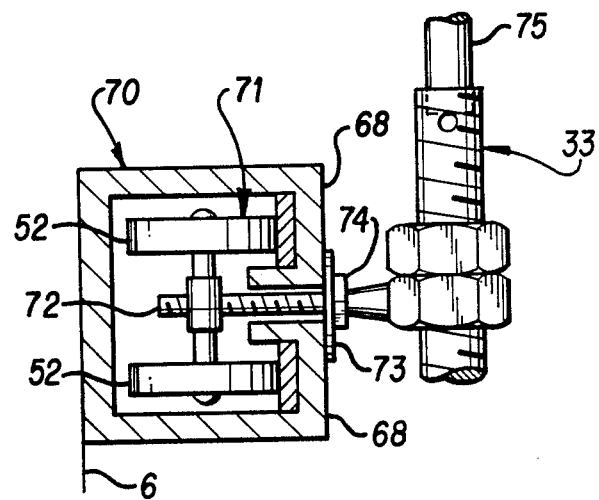

In the alternative embodiments of FIGS. 10 and 11, modified roller assemblies are employed to adjustably retain the same baffle support rods 33 relative to the two top channels in the basin. With the roller assembly 65 as shown in FIG. 10, the pulleys 66 are carried by a selected number of the mount rod axles 67, intermediate the channel inner walls 68,68 and mount rod collar 69. With this arrangement, smaller top channels 70 are required in view of the disposition of the pulleys 66 exteriorly of the channels and accordingly, the rods 33 and attached baffles or membranes 8 will extend a greater width across the basin or, closer to the side walls 5,6.

In the case of the roller assembly 71 as shown in the modification of FIG. 11, the pulleys and chains as utilized in the previous embodiments may be eliminated altogether. To secure the roller assemblies 71 and joined support rods 33 at the desired inclination, the two endmost mount rod axles 72 and selected intermediate ones are provided with a bearing washer 73 and adjacent bearing nut 74. In this manner, the adjusted support rods 33 are secured in position by the tightening of the bearing nuts 74, thereby sandwiching the channel inner walls 68,68 between the rollers 52,52 and bearing washers 73. Alteration of the baffle or membrane inclination is readily achieved by loosening the bearing nuts 74 and moving the top portion of one of the endmost support rods 33, whereupon the abutting rollers 52 within the slotted channels 70 produce a simultaneous displacement of all of the roller assemblies 71. To facilitate this displacement of the support rods, an appropriate tool, such as the rod or lever 75, may be affixed to or removably attached to the top portion of the two endmost support rods 33.

Figure 5:
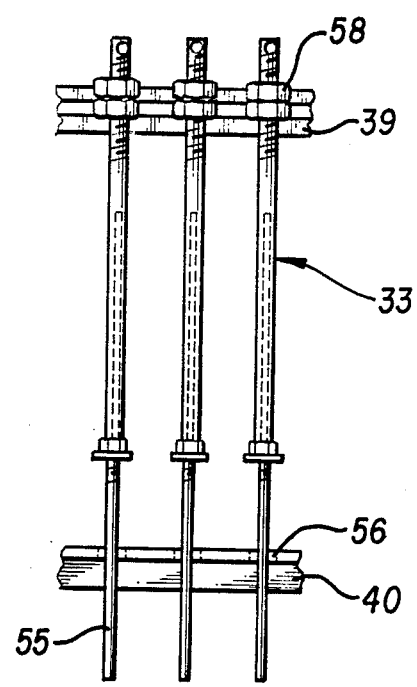
FIGS. 5 and 6 are enlarged side elevation views illustrating alternate positions of the adjustably mounted settler member support rods.

The above described adjustable mounting of the baffles 8 permits the positioning of the baffles at a precise angle of inclination in order to maximize the sedimentation process in accordance with the liquid parameters at hand. In this manner, flow rates and settling velocities of the particles to be removed from the liquid may be taken into consideration and the baffle inclination selected accordingly. Also, the procedure of clearing the baffle surfaces of accumulated solid particles is facilitated as the adjustment mechanism may be operated to position the baffles in the true vertical plane as shown in FIG. 5, thereby encouraging such particles to fall by gravity to the lower reaches of the basin. If more thorough cleaning, or inspection of individual baffles is required, the connecting links 62 of drive chain 60 can be released from the roller assembly axles 49, thereby allowing the top ends of one or more support rods 33 to be spread apart for inspecting the baffles. In the case of the embodiment shown in FIG. 11, the bearing nut 74 may be loosened to provide free movement of the support rods and inspection of the baffles.

The replacement of individual baffles 8 can be accomplished without materially interfering with the operation of the settler unit. After loosening of the lock nut 58 and allowing the support rods 33 to rotate as the tension at each end of a baffle is relieved, the respective dowels 38 are pulled from the closed loop 37 of the baffle and removed from the top end of the support rod 33. The baffle ends are then free to be pulled through the support rod slots 35. Replacement of any baffle is accomplished by a reversal of the foregoing procedure. Should additional baffles be needed, these can be inserted at one end of the top channels 39 with the last baffle securely fastened to the drive chains 60 by means of connecting links 62 or alternatively, by using the bearing nuts 74 on the mount rod axles, as in FIG. 11.

It is to be understood that the present invention is not limited to the sole embodiment described above, but encompasses any and all embodiments within the scope of the following claims.

I claim:

1. An apparatus for sedimentation of particles from liquid comprising;
    a basin including a pair of substantially parallel side walls, inlet and outlet means in said basin for respectively admitting and discharging liquid from said basin, said outlet means defining a top surface of liquid within said basin,
    a plurality of substantially planar settler members having opposite ends and spanning said basin,
    elongated support means having opposite ends and attached to said settler member ends, mounting means on said basin including a top channel and bottom support member engageable with said support means opposite ends, said mounting means including longitudinally displaceable means operable to vary the inclination of said support means and attached settler member ends, and said longitudinally displaceable means including a roller assembly within said top channel adjacent each said settler member end.

2. An apparatus for sedimentation of particles from liquid according to claim 1 wherein, said settler members comprise flexible stretchable material.

3. An apparatus for sedimentation of particles from liquid according to claim 2 wherein, said support means includes adjustable means operable to apply variable tension upon said settler member opposite ends.

4. An apparatus for sedimentation of particles from liquid according to claim 1 wherein, said inlet means includes a plurality of ports through at least one said side wall.

5. An apparatus for sedimentation of particles from liquid according to claim 4 wherein, said ports are disposed in a plane beneath said settler members.

6. An apparatus for sedimentation of particles from liquid according to claim 1 wherein, said basin includes a bottom wall, sludge collecting means adjacent said bottom wall including an endless conveying means having opposite ends, and a sludge hopper beneath one said conveyor opposite end.

7. An apparatus for sedimentation of particles from liquid according to claim 1 wherein, said basin includes a trailing end wall, said outlet means including a plurality of effluent ports through said end wall, and a plurality of perforated pipes within said basin disposed adjacent said liquid top surface and communicating with said ports.

8. An apparatus for sedimentation of particles from liquid according to claim 1 wherein, said basin includes a pair of end walls, said outlet means including a plurality of effluent ports through at least one said end wall, a plurality of perforated pipes within said basin disposed adjacent said liquid top surface and communicating with said ports.

9. An apparatus for sedimentation of particles from liquid according to claim 1 wherein, said elongated support means includes a slotted rod, and said settler member ends removably insertable through said slotted rods.

10. An apparatus for sedimentation of particles from liquid according to claim 9 including, releasable means on said support rods selectively adjustable to permit variation of the inclination of said rods relative said support means.

11. An apparatus for sedimentation of particles from liquid according to claim 1 wherein, each said roller assembly includes a pair of rollers within said channel, and adjacent ones of said rollers abutting one another, whereby actuation of said longitudinally displaceable means horizontally shifts at least one said roller assembly which in turn shifts all abutting ones of said rollers and roller assemblies.

12. An apparatus for sedimentation of particles from liquid according to claim 1 wherein, said elongated support means includes a plurality of tubular rods having a top portion provided with a threaded portion, said mounting means including a collar engageable with each said rod threaded portion, said rods having a longitudinal slot therein each adapted to removably receive one said settler member end, and lock means on said rod threaded portions operable to secure said rods relative said mounting means collar, whereby upon release of said lock means said rods may be rotated to increase and decrease the tension as applied to said settler members and thereafter tightened against said collar to maintain said tension.

* * * * *